(12) United States Patent
Tu et al.

(10) Patent No.: US 8,937,814 B2
(45) Date of Patent: Jan. 20, 2015

(54) POSITIONING STRUCTURE, POSITIONING SECURING STRUCTURE AND ELECTRONIC DEVICE

(75) Inventors: Chun Tang Tu, Taipei (TW); Chuan-Chieh Tseng, Taipei (TW); Yung-Lung Liu, Taipei (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 321 days.

(21) Appl. No.: 13/548,951

(22) Filed: Jul. 13, 2012

(65) Prior Publication Data
US 2013/0308285 A1 Nov. 21, 2013

(30) Foreign Application Priority Data
May 15, 2012 (CN) .................... 2012 2 0215653 U

(51) Int. Cl.
*H05K 7/02* (2006.01)
*H05K 7/04* (2006.01)

(52) U.S. Cl.
USPC ...................................... 361/807; 174/138 E

(58) Field of Classification Search
USPC ......... 361/728–730, 752, 796, 800, 807, 809, 361/810; 174/138 E, 138 G
See application file for complete search history.

(56) References Cited

U.S. PATENT DOCUMENTS

| | | | |
|---|---|---|---|
| 6,262,887 B1 * | 7/2001 | Lee .......................... | 361/679.27 |
| 6,493,233 B1 * | 12/2002 | De Lorenzo et al. ......... | 361/752 |
| 6,560,119 B1 * | 5/2003 | Katsuyama et al. .......... | 361/752 |
| 6,923,691 B2 * | 8/2005 | Ireland ........................ | 439/876 |
| 7,052,291 B2 * | 5/2006 | Barina et al. ................ | 439/92 |
| 7,072,176 B2 * | 7/2006 | Lin et al. .................... | 361/679.02 |
| 7,119,276 B2 * | 10/2006 | Pav et al. .................... | 174/542 |
| 8,199,497 B2 * | 6/2012 | Wu ............................. | 361/679.58 |

* cited by examiner

*Primary Examiner* — Hung S Bui
(74) *Attorney, Agent, or Firm* — Li & Cai Intellectual Property (USA) Office

(57) ABSTRACT

A positioning structure for positioning a plate-shaped structure having at least one positioning hole is disclosed. The positioning structure includes at least one positioning element corresponding to the positioning hole, and the positioning element includes a placement portion for supporting the plate-shaped structure and a positioning portion extending toward a direction far away from the placement portion to form a hollow cylinder shape, and the positioning portion has an outer surrounding surface and a plurality of inner threads. Hence, when the outer surrounding surface of the positioning portion of the positioning element is inserted into the positioning hole to contact with the inner surface of the positioning hole, the positioning portion of the position element can be positioned in the positioning hole, thus the instant disclosure can be used to accurately position and secure the plate-shaped structure.

15 Claims, 6 Drawing Sheets

POSITIONING STRUCTURE, POSITIONING SECURING STRUCTURE AND ELECTRONIC DEVICE

BACKGROUND OF THE INVENTION

1. Field of the Invention

The instant disclosure relates to a positioning structure, a positioning securing structure and an electronic device, and more particularly, to a positioning structure for positioning a plate-shaped structure, a positioning securing structure for positioning and securing a plate-shaped structure, and an electronic device using a positioning securing structure.

2. Description of Related Art

Recently, as the vigorous development of science and technology and information, computer equipment has become a quite popularized electronic device. As for the computer equipments available on the current market, no matter desktop computers, notebooks or servers, a motherboard must be installed therein to serve as a core member for the computer system, such that the central processing unit (CPU), memory module, peripheral controller interface (PCI) card, and other computer peripheral hardware electrically connected onto the motherboard are capable of successively executing preset functions.

As for the common manner of fixing the motherboard, a plurality of conductive stand off is disposed on a case of computer device to serve as fixing components, and a plurality of through holes corresponding to the stand off is opened on the motherboard. The motherboard is placed on the stand off, and keeps a suitable distance from the case. Then, a plurality of bolts is used to pass through the through holes of the motherboard and then screwed on the stand off, such that the motherboard generates a suspension effect through using the stand off, so as to prevent the weld leg contacts on the back side of the motherboard from directly contacting the case to result in short circuit.

In the conventional manner of screwing and fixing the motherboard through using the stand off, during the process of assembling and disassembling the motherboard, the user must repeatedly screw and unscrew the bolts one by one, so it is quite time consuming and complex, which is quite inconvenient in the practical operations. The current electronic devices are required to be light, thin, short, and small, too many stand off may occupy too much area on the motherboard, as a result, the circuit layout on the motherboard may become complicated, and the overall electronic device cannot be miniaturized. More importantly, the motherboard still cannot be accurately positioned on a predetermined position due to the offset of the motherboard by using the stand off.

SUMMARY OF THE INVENTION

One aspect of the instant disclosure relates to a positioning structure for positioning a plate-shaped structure, a positioning securing structure for positioning and securing a plate-shaped structure, and an electronic device using a positioning securing structure.

One of the embodiments of the instant disclosure provides a positioning structure for positioning a plate-shaped structure having at least one positioning hole, the positioning structure comprising at least one positioning element corresponding to the at least one positioning hole, wherein the at least one positioning element includes: a placement portion for supporting the plate-shaped structure and a positioning portion extending toward a direction far away from the placement portion to form a hollow cylinder shape, wherein the positioning portion has an outer surrounding surface and a plurality of inner threads. Hence, the outer surrounding surface of the positioning portion of the at least one positioning element contacts with the inner surface of the at least one positioning hole, for positioning the positioning portion of the at least one position element in the at least one positioning hole.

Another one of the embodiments of the instant disclosure provides a positioning securing structure for positioning and securing a plate-shaped structure having at least one positioning hole, the positioning securing structure comprising: a positioning structure and a securing structure. The positioning structure includes at least one positioning element corresponding to the at least one positioning hole, wherein the at least one positioning element includes a placement portion for supporting the plate-shaped structure and a positioning portion extending toward a direction far away from the placement portion to form a hollow cylinder shape, and the positioning portion has an outer surrounding surface and a plurality of inner threads. The securing structure includes at least one securing element corresponding to the at least one positioning element, wherein the at least one securing element has a plurality of outer threads securely mated with the inner threads of the positioning portion of the at least one positioning element. Hence, the outer surrounding surface of the positioning portion of the at least one positioning element contacts with the inner surface of the at least one positioning hole, for positioning the positioning portion of the at least one position element in the at least one positioning hole.

Yet another one of the embodiments of the instant disclosure provides an electronic device, comprising: a casing structure, a plate-shaped structure, a positioning structure and a securing structure. The plate-shaped structure is disposed in the casing structure, wherein the plate-shaped structure has at least one positioning hole. The positioning structure is disposed in the casing structure, wherein the positioning structure includes at least one positioning element corresponding to the at least one positioning hole, wherein the at least one positioning element includes a placement portion for supporting the plate-shaped structure and a positioning portion extending toward a direction far away from the placement portion to form a hollow cylinder shape, and the positioning portion has an outer surrounding surface and a plurality of inner threads. The securing structure includes at least one securing element corresponding to the at least one positioning element, wherein the at least one securing element has a plurality of outer threads securely mated with the inner threads of the positioning portion of the at least one positioning element. Hence, the outer surrounding surface of the positioning portion of the at least one positioning element contacts with the inner surface of the at least one positioning hole, for positioning the positioning portion of the at least one position element in the at least one positioning hole.

More precisely, when the outer surrounding surface of the positioning portion of the positioning element is inserted into the positioning hole to contact with the inner surface of the positioning hole, the positioning portion of the position element can be positioned in the positioning hole, thus the positioning structure, the positioning securing structure and the electronic device can be used to accurately position and secure the plate-shaped structure.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

Figure 1A:
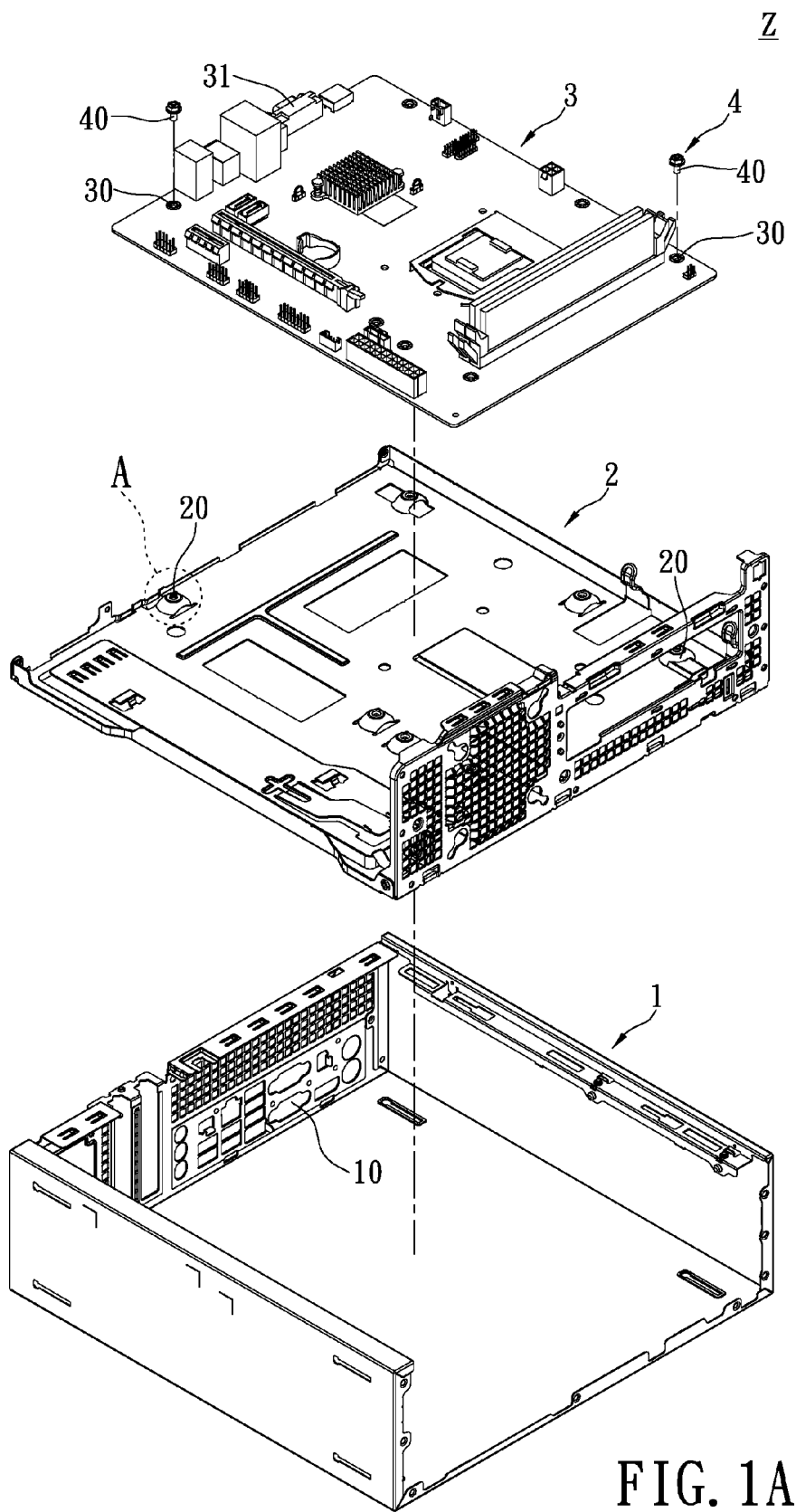
FIG. 1A shows a perspective, exploded, schematic view of the electronic device according to the instant disclosure.
Figure 1B:
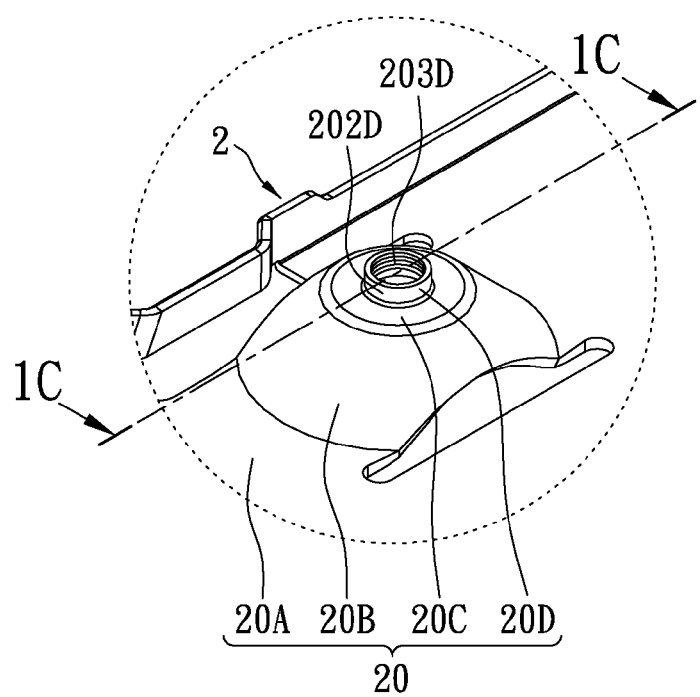
FIG. 1B shows an enlarged view taken on part A of FIG. 1A.
Figure 1C:
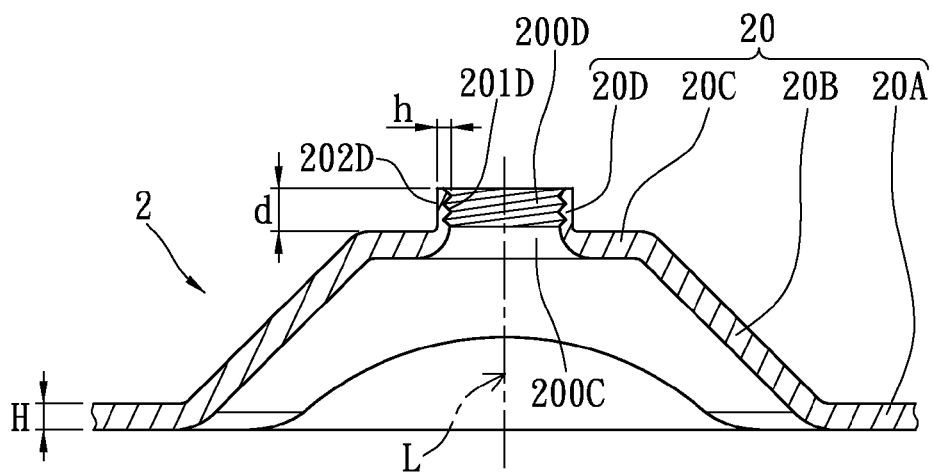
FIG. 1C shows a cross-sectional view taken along the section line 1C-1C of FIG. 1B.
Figure 2A:
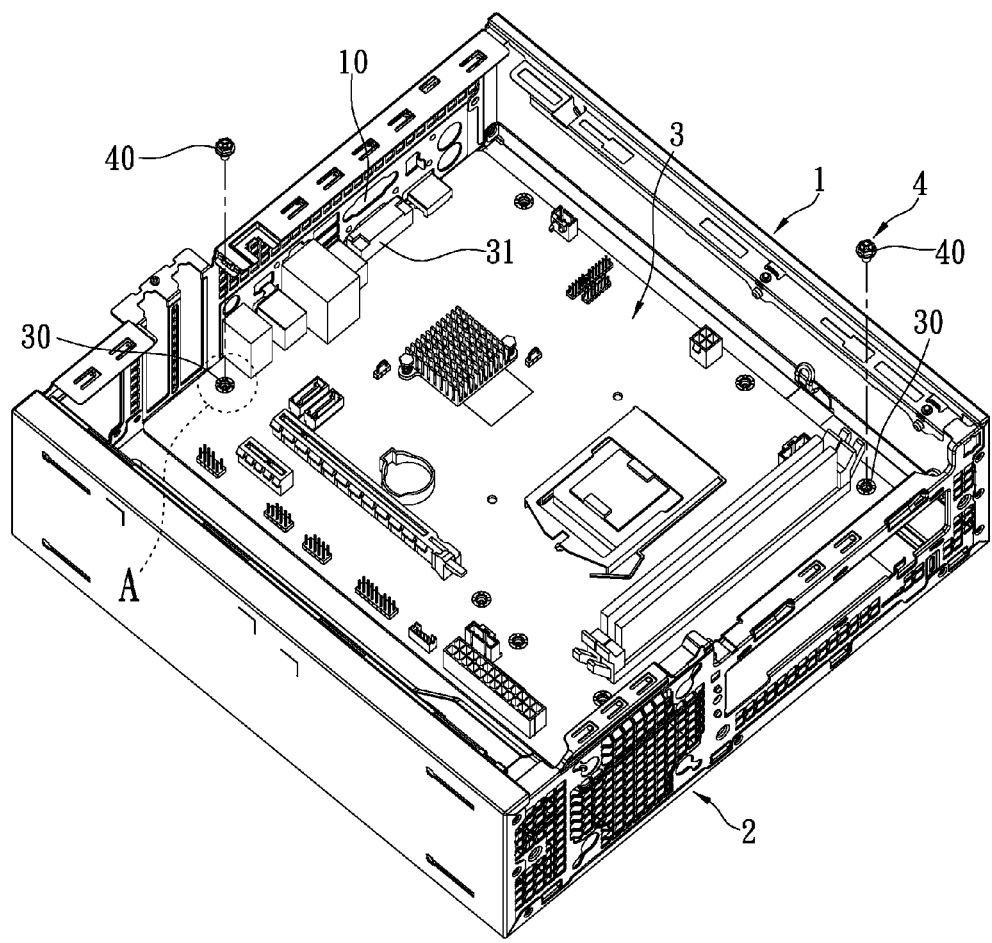
FIG. 2A shows a partial, perspective, exploded, schematic view of the electronic device according to the instant disclosure.
Figure 2B:
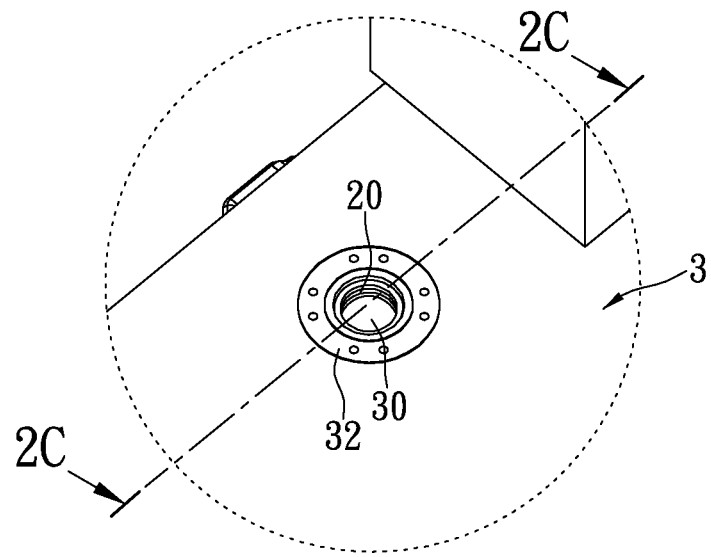
FIG. 2B shows an enlarged view taken on part A of FIG. 2A.
Figure 2C:
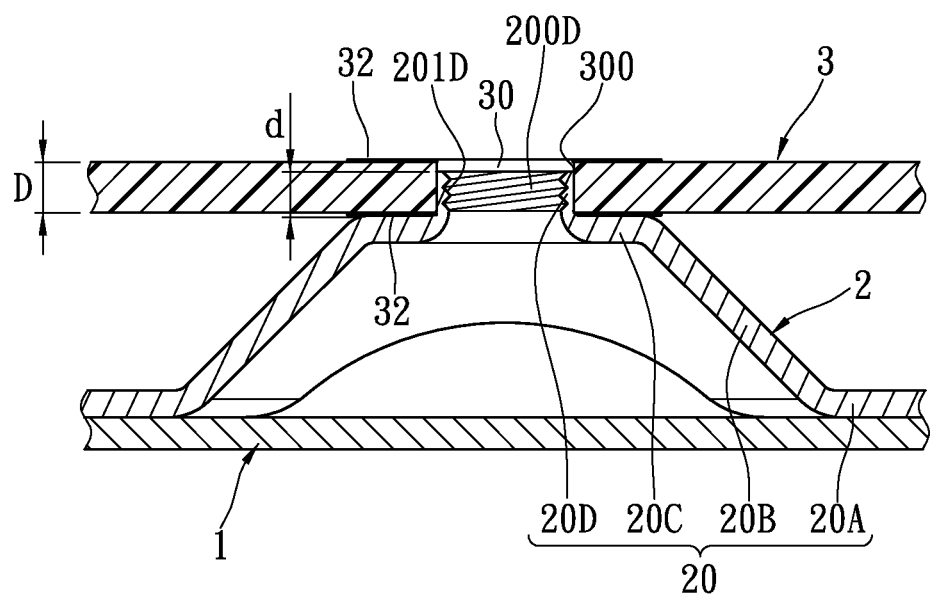
FIG. 2C shows a cross-sectional view taken along the section line 2C-2C of FIG. 2B.
Figure 3A:
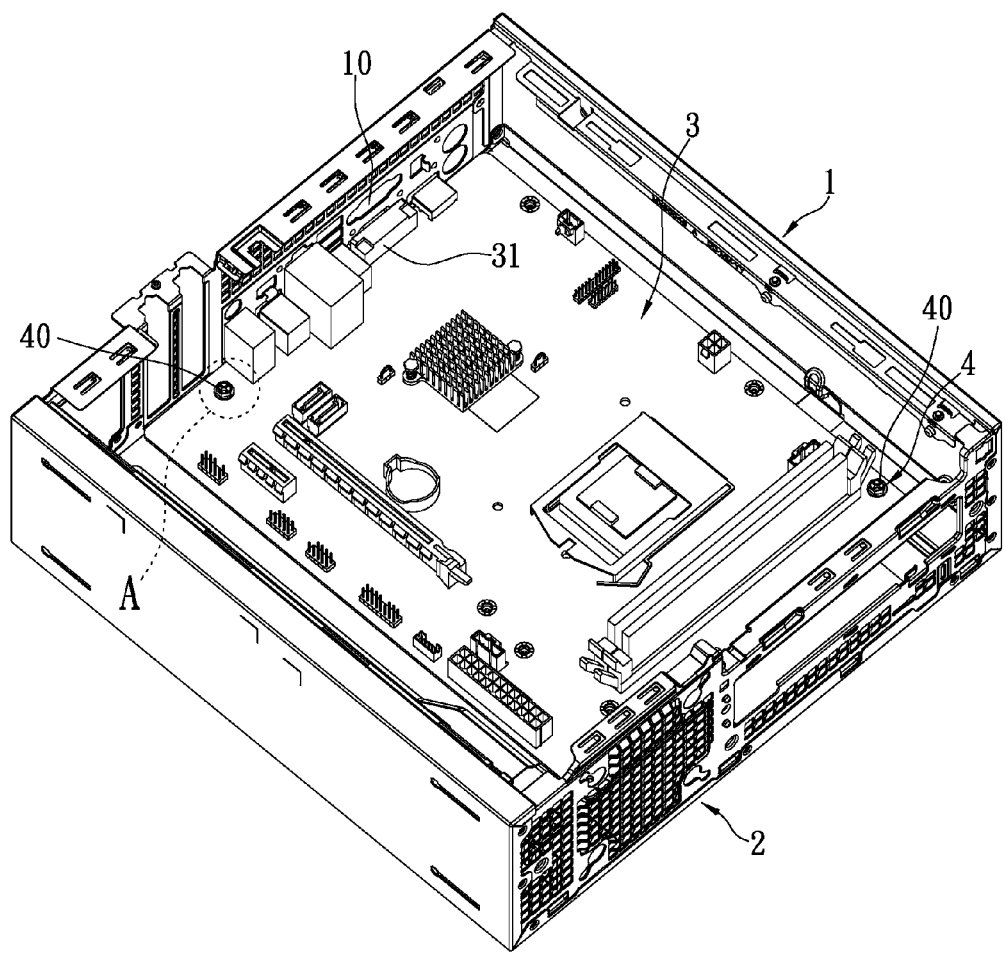
FIG. 3A shows a perspective, assembled, schematic view of the electronic device according to the instant disclosure.
Figure 3B:
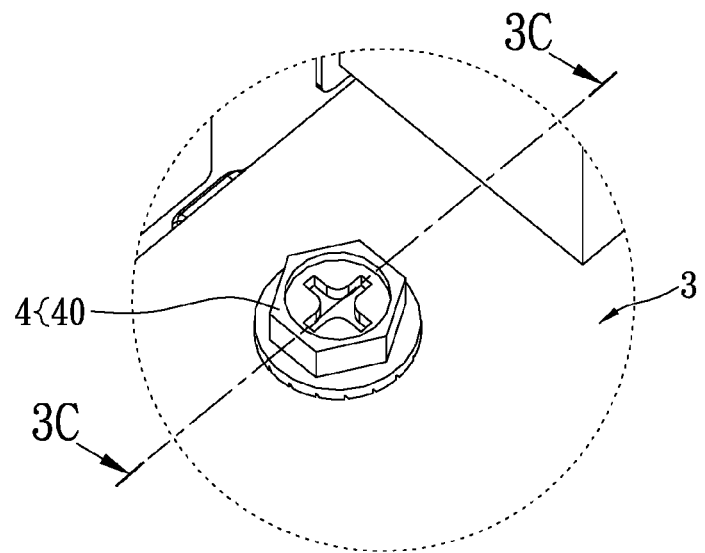
FIG. 3B shows an enlarged view taken on part A of FIG. 3A.
Figure 3C:
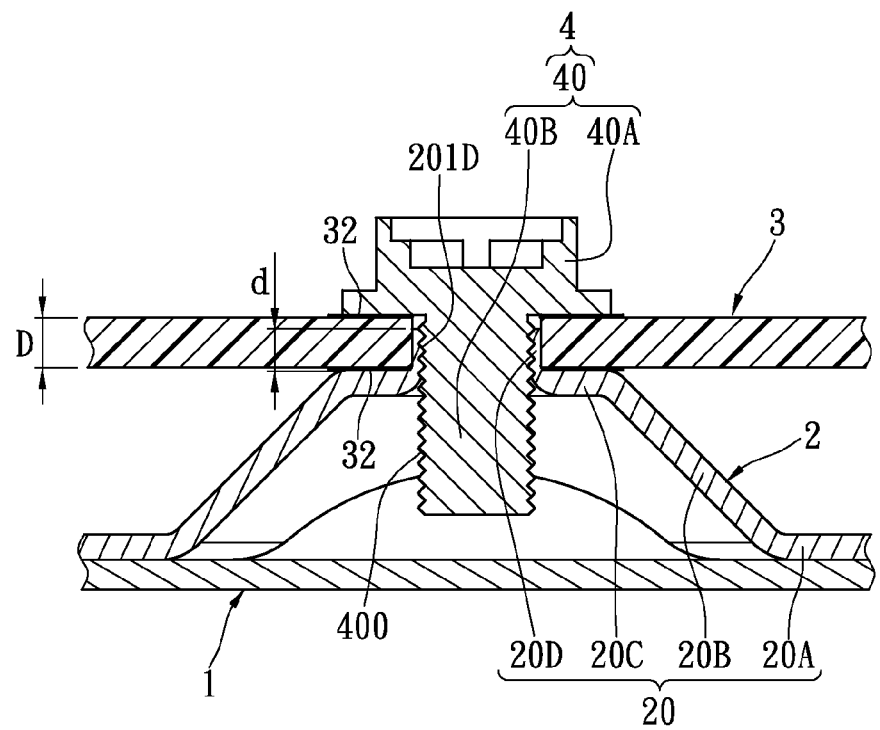
FIG. 3C shows a cross-sectional view taken along the section line 3C-3C of FIG. 3B.

Referring to FIG. 1A to FIG. 3C, where FIG. 1A is a perspective, exploded, schematic diagram, FIG. 2A is a partial, perspective, exploded, schematic diagram, FIG. 3A is a perspective, assembled, schematic diagram, FIGS. 1B, 2B and 3B are enlarged diagrams, and FIGS. 1C, 2C and 3C are cross-sectional diagrams. The instant disclosure provides an electronic device Z comprises a casing structure 1, a positioning structure 2, a plate-shaped structure 3 and a securing structure 4, where the plate-shaped structure 3 includes a plurality of electrical connectors 31.

First, referring to FIG. 1A, the casing structure 1 may be a computer chassis for a computer host, thus the casing structure 1 may have a plurality of connector openings 10 formed in advance for respectively exposing the electrical connectors 31 of the plate-shaped structure 3. However, the casing structure 1 used in this embodiment is merely an example and is not meant to limit the instant disclosure.

Moreover, referring to FIG. 1A and FIG. 2A, the positioning structure 2 and the plate-shaped structure 3 can be disposed in the casing structure 1, for example, the positioning structure 2 can be fixed in the casing structure 1 through many fixing elements (not shown). However, the method of fixing the positioning structure 2 in the casing structure 1 used in this embodiment is merely an example and is not meant to limit the instant disclosure.

In addition, referring to FIGS. 1A, 1B and 1C, where FIG. 1B shows an enlarged view taken on part A of FIG. 1A, and FIG. 1C shows a cross-sectional view taken along the section line 1C-1C of FIG. 1B. The positioning structure 2 includes two positioning elements 20 separated from each other, and the two positioning elements 20 separated from each other is set at a predetermined distance, where each positioning element 20 includes a base portion 20A, an extending portion 20B, a placement portion 20C and a positioning portion 20D. The base portion 20A, the extending portion 20B, the placement portion 20C and the positioning portion 20D can be integrally formed as a one-piece component.

More precisely, the extending portion 20B can be inclinedly extended toward a direction far away from the base portion 20A, for example, the extending portion 20B can be extended inclinedly toward a direction from two face-to-face inner sides to a center line L to form a first surrounding portion having a top surface similar to an arch bridge shape. The placement portion 20C is connected to the extending portion 20B, thus when the plate-shaped structure 3 is placed on the placement portion 20C and supported by the placement portion 20C, the plate-shaped structure 3 being separated from the base portion 20A is set at a predetermined distance. The placement portion 20C can be extended surroundingly toward a direction from the extending portion 20B to the center line L to form a second surrounding portion that is connected to the first surrounding portion and has a top surface shown as a plane shape, and the placement portion 20C has a through opening 200C. The positioning portion 20D can be surroundingly, vertically and upwardly extended from the placement portion 20C to form a third surrounding portion shown as a hollow cylinder shape that is connected to the second surrounding portion, that is to say, the positioning portion 20D is extended toward the direction far away from the placement portion 20C to form the hollow cylinder shape. The positioning portion 20D has a through hole 200D communicated with the through opening 200C and a plurality of inner threads 201D formed in the through hole 200D, where the center line L is the center line of the through hole 200D, and the number of the inner threads 201D of the positioning portion 20D ranges from 1.5 to 2 (1 thread means that the thread is formed around a circle on the positioning portion 20D). However, the number of the inner threads 201D of the positioning portion 20D used in this embodiment is merely an example and is not meant to limit the instant disclosure.

Furthermore, referring to FIG. 1C, the base portion 20A has a top surface and a bottom surface corresponding to the top surface. The positioning portion 20D has an outer surrounding surface 202D and an inner surrounding surface 203D surrounded by the outer surrounding surface 202D. The base portion 20A has a thickness H defined between the top surface and the bottom surface of the base portion 20A, the positioning portion 20D has a thickness h defined between the inner surrounding surface 203D and the outer surrounding surface 202D of the positioning portion 20D, and the thickness H of the base portion 20A is substantially 2 to 3 times larger than the thickness h of the positioning portion 20D. However, the relationship between the thickness H of the base portion 20A and the thickness h of the positioning portion 20D shown in this embodiment is merely an example and is not meant to limit the instant disclosure. Therefore, when the base portion 20A is drawn upwardly to form the positioning portion 20D and the inner threads 201D are formed on the inner surrounding surface 203D of the positioning portion 20D by tapping, the structure strength of the positioning portion 20D can still be maintained at a predetermined value due to the design of the multiple relationship between the thickness H of the base portion 20A and the thickness h of the positioning portion 20D.

Moreover, referring to FIGS. 2A, 2B and 2C, where FIG. 2B shows an enlarged view taken on part A of FIG. 2A, and FIG. 2C shows a cross-sectional view taken along the section line 2C-2C of FIG. 2B. Because the placement portion 20C can be used to support the plate-shaped structure 3, the plate-shaped structure 3 (such as a motherboard) can be disposed on the placement portion 20C of each positioning element 20. The plate-shaped structure 3 has two positioning holes 30 formed on the same plane and respectively corresponding to the two positioning elements 20, and the two positioning holes 30 separated from each other is set at a predetermined distance. For example, the two positioning holes 30 are diagonally formed on the plate-shaped structure 3 and respectively adjacent to two corners of the plate-shaped structure 3. When the positioning portion 20D of each positioning element 20 is inserted into each corresponding positioning hole 30, the positioning portion 20D of each positioning element 20 can be positioned in each corresponding positioning hole 30, and the outer surrounding surface 202D of the positioning portion 20D of each positioning element 20 can tightly contact the inner surface 300 of each corresponding positioning hole 30 without gap almost, thus the plate-shaped structure 3 can be firmly positioned on the placement portion 20C of each positioning element 20 due to the tight combination relationship between the positioning portion 20D of each positioning element 20 and each corresponding positioning hole 30. In other words, the outer surrounding surface 202D of the positioning portion 20D of each positioning element 20 can contact with the inner surface 300 of each corresponding positioning hole 30, for positioning the positioning portion 20D of each position element 20 in each corresponding positioning hole 30. Furthermore, the plate-shaped structure 3 further includes a plurality of electrical connectors 31 respectively exposed from the connector openings 10 and a plurality of washers 32. For example, any two of the washers 32 can be applied to each corresponding positioning hole 30, where one of the two washer 32 can be placed on the top surface of the plate-shaped structure 3, and the other washer 32 can be placed between the bottom surface of the plate-shaped structure 3 and the placement portion 20C of each positioning element 20.

In addition, referring to FIGS. 3A, 3B and 3C, where FIG. 3B shows an enlarged view taken on part A of FIG. 3A, and FIG. 3C shows a cross-sectional view taken along the section line 3C-3C of FIG. 3B. The securing structure 4 includes two securing elements 40 respectively corresponding to the two positioning elements 20, where each securing element 40 can be securely mated with the inner threads 201D in the through hole 200D (as shown in FIG. 2C) of each corresponding positioning element 20, and each securing element 40 has a plurality of outer threads 400 corresponding to the inner threads 201D of the positioning portion 20D of each corresponding positioning element 20. For example, each securing element 40 has a securing head portion 40A disposed on the plate-shaped structure 3 and a securing body portion 40B extended from the securing head portion 40A and securely mated with the inner threads 201D (as shown in FIG. 2C), and the outer threads 400 of each securing element 40 can be formed on the outer surrounding surface of the securing body portion 40B.

Furthermore, referring to FIG. 3C, the plate-shaped structure 3 has a top surface and a bottom surface corresponding to the top surface and contacting the placement portion 20C. The positioning portion 20D has a top side and a bottom side corresponding to the top side and connected to the placement portion 20C. The plate-shaped structure 3 has a thickness D defined between the top surface and the bottom surface of the plate-shaped structure 3, the positioning portion 20D has a height d defined between the top side and the bottom side of the positioning portion 20D, and the thickness D of the plate-shaped structure 3 is larger than the height d of the positioning portion 20D, that is to say, the top surface of the plate-shaped structure 3 is higher than the top side of the positioning portion 20D. However, the relationship between the thickness D of the plate-shaped structure 3 and the height d of the positioning portion 20D shown in this embodiment is merely an example and is not meant to limit the instant disclosure. For example, when the washer 32 can be disposed between the securing head portion 40A of the securing element 40 and the plate-shaped structure 3, the thickness D of the plate-shaped structure 3 can be substantially equal to the height d of the positioning portion 20D, that is to say, the top surface of the plate-shaped structure 3 can be substantially flushed with the top side of the positioning portion 20D. Therefore, when the outer threads 400 of the securing body portion 40B are securely mated with the inner threads 201D of the positioning portion 20D and the washer 32 on the top surface of the plate-shaped structure 3 is pressed downwardly by the securing head portion 40A, the plate-shaped structure 3 can be firmly secured on the placement portion 20C of each positioning element 20 by the securing elements 4 due to the comparison relationship between the thickness D of the plate-shaped structure 3 and the height d of the positioning portion 20D.

Referring to FIG. 2B and FIG. 2C, the instant disclosure provides a positioning structure 2 that not only can be applied to the electronic device Z, but also can be applied to any structure including the plate-shaped structure 3 with two positioning holes 30. For example, the positioning structure 2 includes two positioning elements 20 disposed on the same plane and respectively corresponding to the two positioning holes 30, and each positioning element 20 includes a placement portion 20C and a positioning portion 20D. In addition, the placement portion 20C can be used to support the plate-shaped structure 3. The positioning portion 20D can be extended toward a direction far away from the placement portion 20C to form a hollow cylinder shape. When the positioning portion 20D is inserted into the corresponding through hole 30, the outer surrounding surface of the positioning portion 20D can contact with the inner surface of the corresponding positioning hole 30, and the positioning portion 20D has a through hole 200D and a plurality of inner threads 201D formed in the through hole 200D. In other words, the outer surrounding surface 202D of the positioning portion 20D of each positioning element 20 can contact with the inner surface 300 of each corresponding positioning hole 30, for positioning the positioning portion 20D of each position element 20 in each corresponding positioning hole 30.

Referring to FIG. 3B and FIG. 3C, the instant disclosure provides a positioning securing structure for positioning and securing a plate-shaped structure 3, the positioning securing structure not only can be applied to the electronic device Z, but also can be applied to any structure including the plate-shaped structure 3 with two positioning holes 30. For example, the positioning securing structure includes a positioning structure 2 and a securing structure 4. The positioning structure 2 includes two positioning elements 20 disposed on the same plane and respectively corresponding to the two positioning holes 30, and each positioning element 20 includes a placement portion 20C and a positioning portion 20D. In addition, the placement portion 20C can be used to support the plate-shaped structure 3. The positioning portion 20D can be extended toward a direction far away from the placement portion 20C to form a hollow cylinder shape. When the positioning portion 20D is inserted into the corresponding through hole 30, the outer surrounding surface of the positioning portion 20D can contact with the inner surface of the corresponding positioning hole 30, and the positioning portion 20D has a through hole 200D and a plurality of inner threads 201D formed in the through hole 200D. In other words, the outer surrounding surface 202D of the positioning portion 20D of each positioning element 20 can contact with the inner surface 300 of each corresponding positioning hole 30, for positioning the positioning portion 20D of each position element 20 in each corresponding positioning hole 30. In addition, the securing structure 4 includes two securing elements 40 respectively corresponding to the two positioning element 20, where each securing element 40 is securely mated with the through hole 200D of the corresponding positioning element 20, and each securing element 40 has a plurality of outer threads 400 securely mated with the inner threads 201D of the positioning portion 20D of the corresponding positioning element 20.

In conclusion, when the outer surrounding surface of the positioning portion of the positioning element is inserted into the positioning hole to contact with the inner surface of the positioning hole, the positioning portion of the position element can be positioned in the positioning hole, thus the positioning structure, the positioning securing structure and the electronic device can be used to accurately position and secure the plate-shaped structure.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A positioning structure for positioning a plate-shaped structure having at least one positioning hole, the positioning structure comprising at least one positioning element corresponding to the at least one positioning hole, wherein the at least one positioning element includes:
    a placement portion for supporting the plate-shaped structure; and
    a positioning portion extending toward a direction far away from the placement portion to form a hollow cylinder shape, wherein the positioning portion has an outer surrounding surface, an inner surrounding surface surrounded by the outer surrounding surface, and a plurality of inner threads;
    wherein the outer surrounding surface of the positioning portion of the at least one positioning element contacts with the inner surface of the at least one positioning hole, for positioning the positioning portion of the at least one position element in the at least one positioning hole;
    wherein the at least one positioning element further comprises a base portion and an extending portion connected between the base portion and the placement portion, and the base portion has a top surface and a bottom surface corresponding to the top surface;
    wherein the base portion has a thickness defined between the top surface and the bottom surface of the base portion, the positioning portion has a thickness defined between the inner surrounding surface and the outer surrounding surface of the positioning portion, and the thickness of the base portion is substantially 2 to 3 times larger than the thickness of the positioning portion.

2. The positioning structure of claim 1, wherein the plate-shaped structure has a top surface and a bottom surface corresponding to the top surface and contacting the placement portion, and the positioning portion has a top side and a bottom side corresponding to the top side and connected to the placement portion, wherein the plate-shaped structure has a thickness defined between the top surface and the bottom surface of the plate-shaped structure, the positioning portion has a height defined between the top side and the bottom side of the positioning portion, and the thickness of the plate-shaped structure is larger than the height of the positioning portion.

3. The positioning structure of claim 1, wherein the extending portion is inclinedly extended toward a direction far away from the base portion, and the plate-shaped structure being separated from the base portion is set at a predetermined distance.

4. The positioning structure of claim 1, wherein the number of the inner threads of the positioning portion ranges from 1.5 to 2.

5. A positioning securing structure for positioning and securing a plate-shaped structure having at least one positioning hole, the positioning securing structure comprising:
    a positioning structure including at least one positioning element corresponding to the at least one positioning hole, wherein the at least one positioning element includes a placement portion for supporting the plate-shaped structure and a positioning portion extending toward a direction far away from the placement portion to form a hollow cylinder shape, and the positioning portion has an outer surrounding surface, an inner surrounding surface surrounded by the outer surrounding surface, and a plurality of inner threads; and
    a securing structure including at least one securing element corresponding to the at least one positioning element, wherein the at least one securing element has a plurality of outer threads securely mated with the inner threads of the positioning portion of the at least one positioning element;
    wherein the outer surrounding surface of the positioning portion of the at least one positioning element contacts with the inner surface of the at least one positioning hole, for positioning the positioning portion of the at least one position element in the at least one positioning hole;
    wherein the at least one positioning element further comprises a base portion and an extending portion connected between the base portion and the placement portion, and the base portion has a top surface and a bottom surface corresponding to the top surface;
    wherein the base portion has a thickness defined between the top surface and the bottom surface of the base portion, the positioning portion has a thickness defined between the inner surrounding surface and the outer surrounding surface of the positioning portion, and the thickness of the base portion is substantially 2 to 3 times larger than the thickness of the positioning portion.

6. The positioning securing structure of claim 5, wherein the plate-shaped structure has a top surface and a bottom surface corresponding to the top surface and contacting the placement portion, and the positioning portion has a top side and a bottom side corresponding to the top side and connected to the placement portion, wherein the plate-shaped structure has a thickness defined between the top surface and the bottom surface of the plate-shaped structure, the positioning portion has a height defined between the top side and the bottom side of the positioning portion, and the thickness of the plate-shaped structure is larger than the height of the positioning portion.

7. The positioning securing structure of claim 5, wherein the extending portion is inclinedly extended toward a direction far away from the base portion, and the plate-shaped structure being separated from the base portion is set at a predetermined distance.

8. The positioning securing structure of claim 5, wherein the number of the inner threads of the positioning portion ranges from 1.5 to 2.

9. The positioning securing structure of claim 5, wherein the at least one securing element has a securing head portion disposed on the plate-shaped structure and a securing body portion extended from the securing head portion and securely mated with the inner threads of the positioning portion of the at least one positioning element, and the outer threads of the at least one securing element are formed on the outer surrounding surface of the securing body portion.

10. An electronic device, comprising:
a casing structure;
a plate-shaped structure disposed in the casing structure, wherein the plate-shaped structure has at least one positioning hole;
a positioning structure disposed in the casing structure, wherein the positioning structure includes at least one positioning element corresponding to the at least one positioning hole, wherein the at least one positioning element includes a placement portion for supporting the plate-shaped structure and a positioning portion extending toward a direction far away from the placement portion to form a hollow cylinder shape, and the positioning portion has an outer surrounding surface, an inner surrounding surface surrounded by the outer surrounding surface, and a plurality of inner threads; and
a securing structure including at least one securing element corresponding to the at least one positioning element, wherein the at least one securing element has a plurality of outer threads securely mated with the inner threads of the positioning portion of the at least one positioning element;
wherein the outer surrounding surface of the positioning portion of the at least one positioning element contacts with the inner surface of the at least one positioning hole, for positioning the positioning portion of the at least one position element in the at least one positioning hole;
wherein the at least one positioning element further comprises a base portion and an extending portion connected between the base portion and the placement portion, and the base portion has a top surface and a bottom surface corresponding to the top surface;
wherein the base portion has a thickness defined between the top surface and the bottom surface of the base portion, the positioning portion has a thickness defined between the inner surrounding surface and the outer surrounding surface of the positioning portion, and the thickness of the base portion is substantially 2 to 3 times larger than the thickness of the positioning portion.

11. The electronic device of claim 10, wherein the casing structure has a plurality of connector openings, and the plate-shaped structure includes a plurality of electrical connectors respectively exposed from the connector openings.

12. The electronic device of claim 10, wherein the plate-shaped structure has a top surface and a bottom surface corresponding to the top surface and contacting the placement portion, and the positioning portion has a top side and a bottom side corresponding to the top side and connected to the placement portion, wherein the plate-shaped structure has a thickness defined between the top surface and the bottom surface of the plate-shaped structure, the positioning portion has a height defined between the top side and the bottom side of the positioning portion, and the thickness of the plate-shaped structure is larger than the height of the positioning portion.

13. The electronic device of claim 10, wherein the extending portion is inclinedly extended toward a direction far away from the base portion, and the plate-shaped structure being separated from the base portion is set at a predetermined distance.

14. The electronic device of claim 10, wherein the number of the inner threads of the positioning portion ranges from 1.5 to 2.

15. The electronic device of claim 10, wherein the at least one securing element has a securing head portion disposed on the plate-shaped structure and a securing body portion extended from the securing head portion and securely mated with the inner threads of the positioning portion of the at least one positioning element, and the outer threads of the at least one securing element are formed on the outer surrounding surface of the securing body portion.

* * * * *